US011813742B2

(12) United States Patent
Koda et al.

(10) Patent No.: US 11,813,742 B2
(45) Date of Patent: Nov. 14, 2023

(54) FOOT STRUCTURE OF LEGGED MOBILE ROBOT AND LEGGED MOBILE ROBOT

(71) Applicant: SONY INTERACTIVE ENTERTAINMENT INC., Tokyo (JP)

(72) Inventors: Yuta Koda, Tokyo (JP); Koichi Obana, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 14 days.

(21) Appl. No.: 17/763,226

(22) PCT Filed: Oct. 19, 2020

(86) PCT No.: PCT/JP2020/039262
§ 371 (c)(1),
(2) Date: Mar. 24, 2022

(87) PCT Pub. No.: WO2021/079848
PCT Pub. Date: Apr. 29, 2021

(65) Prior Publication Data
US 2022/0355465 A1 Nov. 10, 2022

(30) Foreign Application Priority Data

Oct. 25, 2019 (JP) .................................. 2019-194417

(51) Int. Cl.
*B25J 5/00* (2006.01)
*B25J 19/00* (2006.01)
*B25J 19/02* (2006.01)

(52) U.S. Cl.
CPC ............. *B25J 5/00* (2013.01); *B25J 19/0091* (2013.01); *B25J 19/02* (2013.01)

(58) Field of Classification Search
CPC . B25J 5/00; B25J 19/0091; B25J 19/02; B25J 13/085; B25J 9/0006; B25J 9/0009;
(Continued)

(56) References Cited

U.S. PATENT DOCUMENTS

| 7,756,605 B2 * | 7/2010 | Hirose | B25J 13/085 |
| | | | 901/1 |
| 10,189,519 B2 * | 1/2019 | Hurst | B62D 57/032 |
| 2005/0080511 A1 * | 4/2005 | Takenaka | B62D 57/032 |
| | | | 700/245 |

FOREIGN PATENT DOCUMENTS

| JP | 2000-254888 A | 9/2000 |
| JP | 2000254888 A * | 9/2000 |

(Continued)

OTHER PUBLICATIONS

International Search Report and Written Opinion dated Nov. 24, 2020, from PCT/JP2020/039262, 10 sheets.

*Primary Examiner* — Khoi H Tran
*Assistant Examiner* — Nhi Q Bui
(74) *Attorney, Agent, or Firm* — XSENSUS LLP (57) ABSTRACT

A configuration that exerts floor reaction force directly to a force sensor in a foot of a legged mobile robot requires a sensor having a large withstand load. A foot (10*f*) includes an upper frame (44) that is connected to a movable leg and receives the load of a robot, a lower frame (48) that is deployed under the upper frame (44) and contacts with a walking surface, a high rigidity spring (50) attached the lower frame (48) and elastically supporting the upper frame (44) against the load, and a plurality of sensor mechanisms that detect floor reaction force at positions different from each other on the lower frame (48). Each of the sensor mechanisms includes a force sensor (62) attached to one of the upper frame (44) and the lower frame (48) and a sensor spring (52) that is an elastic body having rigidity lower than that of the high rigidity spring (50) and has a supporting point deployed on the other one of the upper frame (44) and the lower frame (48) so as to exert pressing force to the force sensor (62) according to a change of the distance between the upper frame (44) and the lower frame (48).

6 Claims, 5 Drawing Sheets

(58) Field of Classification Search
CPC .... B62D 57/032; B62D 57/024; B62D 57/02; B62D 57/028; A61G 5/128; A61G 5/10; A61G 5/0755
See application file for complete search history.

(56) References Cited

FOREIGN PATENT DOCUMENTS

| | | | | |
|---|---|---|---|---|
| JP | 2003-266362 A | | 9/2003 | |
| JP | 2003266362 A | * | 9/2003 | |
| JP | 2014-210330 A | | 11/2014 | |
| JP | 2014210330 A | * | 11/2014 | .............. B25J 15/08 |

* cited by examiner

FOOT STRUCTURE OF LEGGED MOBILE ROBOT AND LEGGED MOBILE ROBOT

TECHNICAL FIELD

The present invention relates to a legged mobile robot that includes movable legs, and particularly to a structure of a foot provided at a lower end of a movable leg and configured to contact with a walking surface.

BACKGROUND ART

In a legged mobile robot that includes movable legs and walks and moves, a sensor for detecting floor reaction force is provided on its feet in order to make it possible to control the posture of the robot and grasp a state of the walking surface.

Especially, in a robot that performs bipedal walking, the sensor is significant for posture control and stable walking. For example, at present, many bipedal walking robots adopt the ZMP (Zero Moment Point) norm for posture control and stable walking. In a case where motion control of a robot is performed using the ZMP as a stability discrimination norm, it is very effective to measure an actual ZMP. Therefore, it is a practice to provide force sensors or the like on feet and calculate a ZMP using an output of the sensors.

In PTL 1 specified below, there is disclosed a structure in which, as a foot flat sensor to be attached to a sole of a robot, a force sensor is sandwiched between an upper plate and a lower plate.

CITATION LIST

Patent Literature

[PTL 1]
Japanese Patent Laid-Open No. 2000-254888

SUMMARY

Technical Problem

A configuration that exerts the load of a robot or the floor reaction force directly to a force sensor has a problem in that a sensor having a large withstand load is required. For example, a large sensor can make reduction in size and weight of feet and reduction of the cost difficult.

The present invention has been made to solve the problem described above, and it is an object of the present invention to provide a foot structure and a legged mobile robot that are, while a force sensor having a small withstand load is used, less likely to be broken by a comparatively large load of the robot or an impact upon walking and are capable of suitably detecting the floor reaction force.

Solution to Problem (1)
The foot structure according to the present invention is a structure of a foot provided at a lower end of a movable leg of a legged mobile robot and includes an instep member that is connected to the movable leg and receives a load of the legged mobile robot, a sole member that is deployed under the instep member and contacts with a walking surface, an elastic supporting member that is attached to the sole member and elastically supports the instep member against the load, and a plurality of sensor mechanisms that detect floor reaction force at positions different from each other on the sole member. Each of the sensor mechanisms includes a force sensor provided on one of the instep member and the sole member, and a sensor pressing member that is an elastic body having rigidity lower than that of the elastic supporting member and has a supporting point deployed on the other of the instep member and the sole member to exert pressing force to the force sensor, according to a change in distance between the instep member and the sole member.

(2)
The foot structure according to (1) above can be configured such that the sensor pressing member is biased and pressed against the force sensor with a distance between the instep member and the sole member at a point of time at which the load exerted to the instep member changes from a positive value to zero.

(3)
The foot structure according to (1) above can be configured such that the foot structure is structured such that, when the sole member is spaced away from the walking surface, the sole member is tethered to the instep member to define an upper limit distance between the instep member and the sole member, and the sensor pressing member is biased and pressed against the force sensor with the upper limit distance between the instep member and the sole member.

(4)
The foot structure according to any one of (1) to (3) above can be configured such that three or more of the sensor mechanisms are provided.

(5)
The foot structure according to (4) above can be configured such that each of the sensor mechanisms is provided at each of four corners of a rectangular shape including sides extending along a forward and rearward direction of the foot and sides extending along a leftward and rightward direction of the foot.

(6)
The foot structure according to any one of (1) to (5) above can be configured such that the sensor pressing member is a leaf spring.

(7)
The foot structure according to any one of (1) to (6) above can be configured such that the force sensor is attached to the instep member, and the sensor pressing member has the supporting point deployed on the sole member.

(8)
The foot structure according to (7) above can be configured such that each of the sensor mechanisms is provided at each of four corners of a rectangular shape including sides extending along a forward and rearward direction of the foot and sides extending along a leftward and rightward direction of the foot, the sensor pressing member is a leaf spring extending along a diagonal line of the rectangular shape, and the sole member has, on the diagonal line, a spring mount to which the sensor pressing member is attached, as the supporting point thereof.

(9)
The foot structure according to any one of (1) to (8) above can be configured such that the elastic supporting member is deployed at each of a plurality of positions of the sole member as viewed in top plan.

(10)
The foot structure according to (9) above can be configured such that the elastic supporting member is a leaf spring elongated in a forward and rearward direction of the foot as viewed in top plan and is deployed at each of opposite left and right end portions of the sole member.

(11)

The foot structure according to (10) above can be configured such that the foot structure further includes spring supporting bases that are provided on the sole member and support thereon opposite ends of the elastic supporting member in the forward and rearward direction such that a middle portion of the elastic supporting member is spaced away upwardly from the sole member, and a spring contacting portion that is a projection provided on a lower face of the instep member so as to face the middle portion of the elastic supporting member at each of the opposite left and right end portions and that is pressed against a range of the elastic supporting member, which range is elongated in the forward and rearward direction, such that elastic force is exerted to the spring contacting portion from the elastic supporting member.

(12)

The foot structure according to (1) above can be configured such that the foot has a substantially rectangular shape as viewed in top plan and has angular portions forming four corners, long sides extending along a forward and rearward direction, and short sides extending along a leftward and rightward direction, the sole member has a spring supporting base at each of the angular portions and has a spring mount on a diagonal line of the substantially rectangular shape in a proximity of each of the angular portions, the elastic supporting members are each a leaf spring elongated in the forward and rearward direction and extend between a pair of the spring supporting bases on a left side of the sole member and between a pair of the spring supporting bases on a right side of the sole member, the sensor pressing member is a leaf spring attached at one end portion thereof to each of the spring mounts and extends along the diagonal line, the other end portion of the sensor pressing member being positioned above an end portion of the elastic supporting member at the angular portion in a proximity of the spring mount, and the instep member has the force sensor deployed at each of the angular portions thereof, the pressing force being exerted to the force sensor from the other end portion of the sensor pressing member, and has, at each of opposite left and right end portions of a lower face thereof, a spring contacting portion that is pressed against a range elongated in the forward and rearward direction of the elastic supporting member such that elastic force is exerted to the spring contacting portion from the elastic supporting member.

(13)

The legged mobile robot according to the present invention includes the foot structure according to any one of (1) to (12) above.

Advantageous Effect of Invention

The present invention makes it possible to obtain a foot structure and a legged mobile robot which are less likely, while a force sensor having a small withstand load is used, to be broken by a comparatively large load of the robot or a shock upon walking and can suitably detect floor reaction force.

DESCRIPTION OF EMBODIMENT

In the following, a mode for carrying out the present invention (hereinafter referred to as an embodiment) is described with reference to the drawings.

Figure 1:
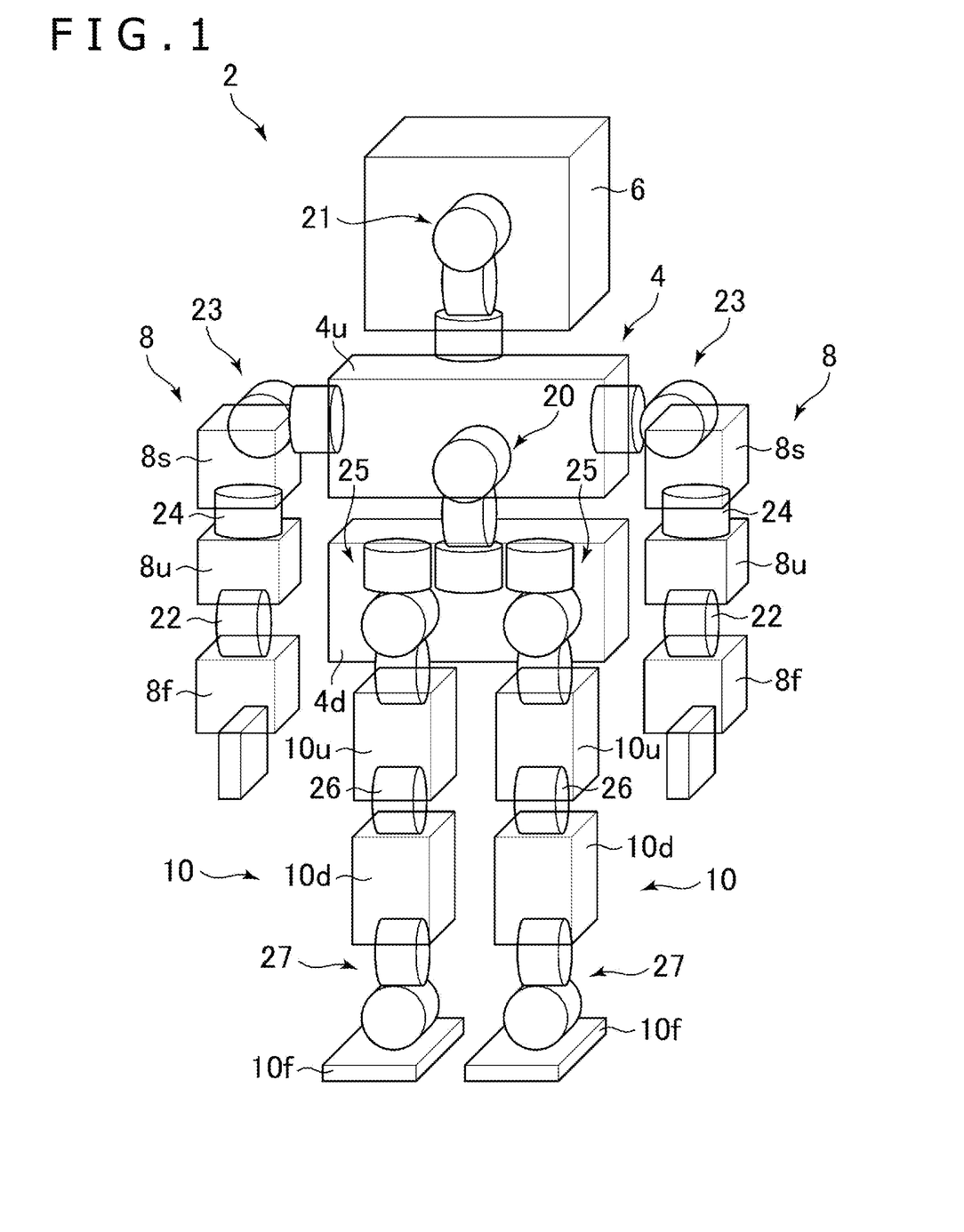
FIG. 1 is a schematic perspective view of a humanoid robot that is an embodiment of the present invention.

FIG. 1 is a schematic view of a humanoid robot 2 that is an embodiment of the legged mobile robot according to the present invention and depicts a perspective view of the humanoid robot 2 in a standing state. The humanoid robot 2 includes a pair of movable legs and practices legged locomotion. Further, the humanoid robot 2 includes, in addition to the legs, movable parts that make movements similar to those of a human being possible. In particular, the humanoid robot 2 includes a body 4, a head 6, and a pair of left and right upper limbs 8 and a pair of left and right lower limbs 10.

The body 4 includes a chest 4$u$ and an abdomen 4$d$ such that the relative angle between them can be changed around three axes for rolling, pitching, and yawing by an actuator group 20.

The head 6 is connected over the chest 4$u$ such that the angle thereof can be changed around three axes for rolling, pitching, and yawing by an actuator group 21 provided at a connection portion equivalent to a neck joint.

Each of the left and right upper limbs 8 includes a first upper limb portion 8$s$, a second upper limb portion 8$u$, and a third upper limb portion 8$f$, which are connected in order from a side edge of the chest 4$u$, and an actuator deployed at each of connection portions of them. The second upper limb portion 8$u$ is equivalent to an upper arm; the third upper limb portion 8$f$ is equivalent to a forearm and a hand; and the connection portion between the second upper limb portion 8$u$ and the third upper limb portion 8$f$ is equivalent to an elbow joint. Bending of the elbow is performed by an actuator 22 provided at the connection portion between the second upper limb portion 8$u$ and the third upper limb portion 8$f$.

The first upper limb portion 8$s$ is equivalent to a shoulder, and an actuator group 23 deployed at a connection portion between the first upper limb portion 8$s$ and the chest 4$u$ can change the roll angle and the pitch angle of the first upper limb portion 8$s$. Meanwhile, an actuator 24 deployed at the connection portion between the first upper limb portion 8$s$ and the second upper limb portion 8$u$ implements a movement equivalent to a twist of the arm.

Each of the left and right lower limbs 10 includes a thigh 10$u$, a lower thigh 10$d$, and a foot 10$f$. The lower limb 10 that is a movable leg is connected at the thigh 10$u$ thereof under the abdomen 4$d$, and the angle of the lower limb 10 can be changed around the three axes for rolling, pitching, and yawing by an actuator group 25 provided at a connection portion equivalent to a hip joint. The lower thigh 10$d$ is connected under the thigh 10$u$. A connection portion between the thigh 10$u$ and the lower thigh 10$d$ is equivalent to a knee joint, and bending of a knee is performed by an actuator 26 provided at this connection portion.

The foot 10$f$ is connected under the lower thigh 10$d$ and is positioned at a lower end of the movable leg. A connection portion between the foot 10f and the lower thigh 10d is equivalent to a foot (ankle) joint, and the roll angle and the pitch angle of the foot 10f are changed by an actuator group 27 provided at this connection portion.

Figure 2:
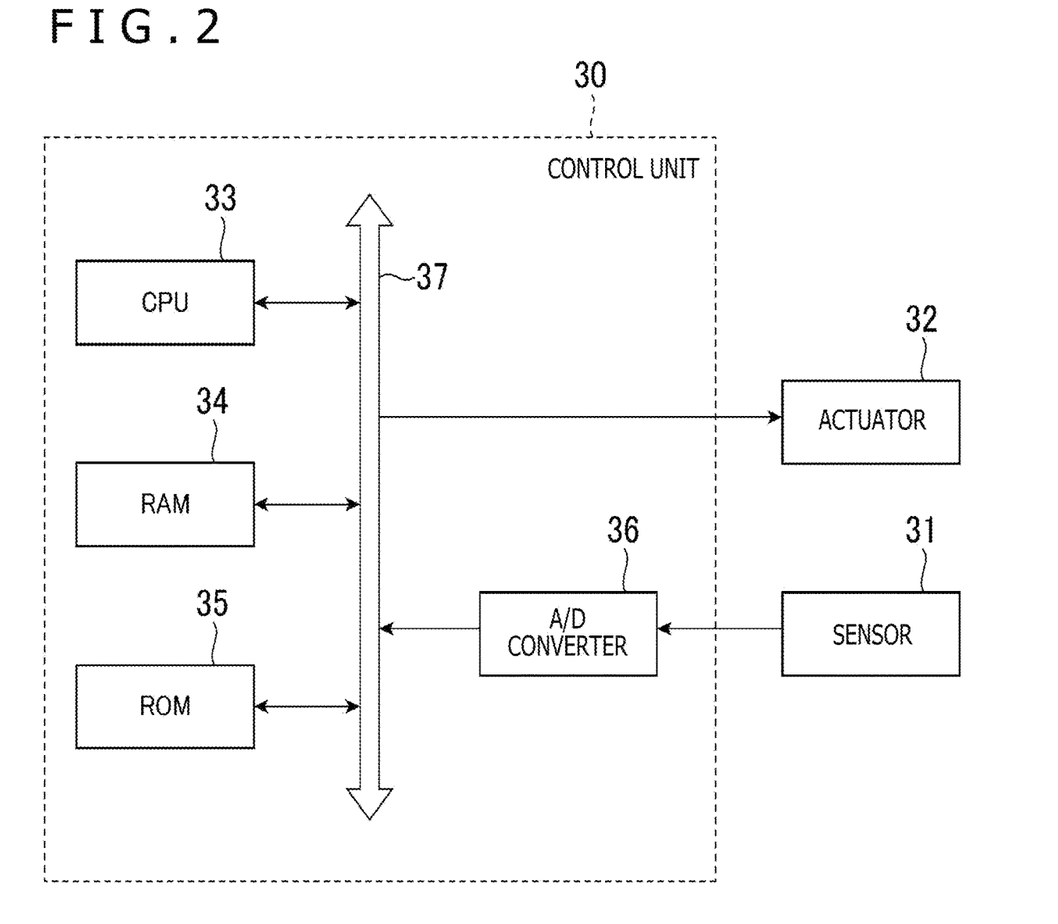
FIG. 2 is a schematic view depicting a general configuration of a control system for the humanoid robot that is the embodiment of the present invention.

FIG. 2 is a schematic view depicting a general configuration of a control system for the humanoid robot 2. A control unit 30 includes an arithmetic logic unit and a storage device. The arithmetic logic unit executes a program stored in the storage device and performs, for example, a process on a signal inputted from sensors 31 mounted on the humanoid robot 2 and generates a control signal for actuators 32.

It is to be noted that, on the humanoid robot 2, the actuators 20 to 27 are deployed as the actuators 32 at the respective joints. Further, the humanoid robot 2 can have various kinds of sensors 31. For example, in a case where the actuator 32 includes a servomotor, outputs of detectors for the angle, the speed, and so forth provided in the servomotor are also inputted as signals of the sensors 31 to the control unit 30. Further, particularly on the foot 10f, a sensor mechanism for detecting the floor reaction force is provided as a sensor relating to the present invention. The control unit 30 detects a state of the humanoid robot 2 and motions of the components on the basis of the outputs of the sensors 31 and controls the various motions including walking. Especially, in control of the walking motion, detection of the center of gravity of the humanoid robot 2 is required, and to this end, detection of the floor reaction force by the sensors provided on the feet 10f is significant.

The control unit 30 includes, for example, a CPU (Central Processing Unit) 33 as an arithmetic logic unit and further includes a RAM (Random Access Memory) 34 and a ROM (Read Only Memory) 35 as storage devices. The control unit 30 can further include an A/D (Analog-to-Digital) converter 36 that converts an analog signal outputted from the sensors 31 into a digital signal. The components of the control unit 30, such as the CPU 33, the RAM 34, the ROM 35, and the A/D converter 36, are connected to each other, for example, through a bus 37, and the actuators 32 may also be configured so as to be connected to the bus 37.

The control unit 30 is configured using, for example, a microcomputer or the like and is incorporated in the humanoid robot 2. Otherwise, the control unit 30 can be configured as a member separated from the humanoid robot 2 and can be connected to the humanoid robot 2 by a cable or the like.

Figure 3:
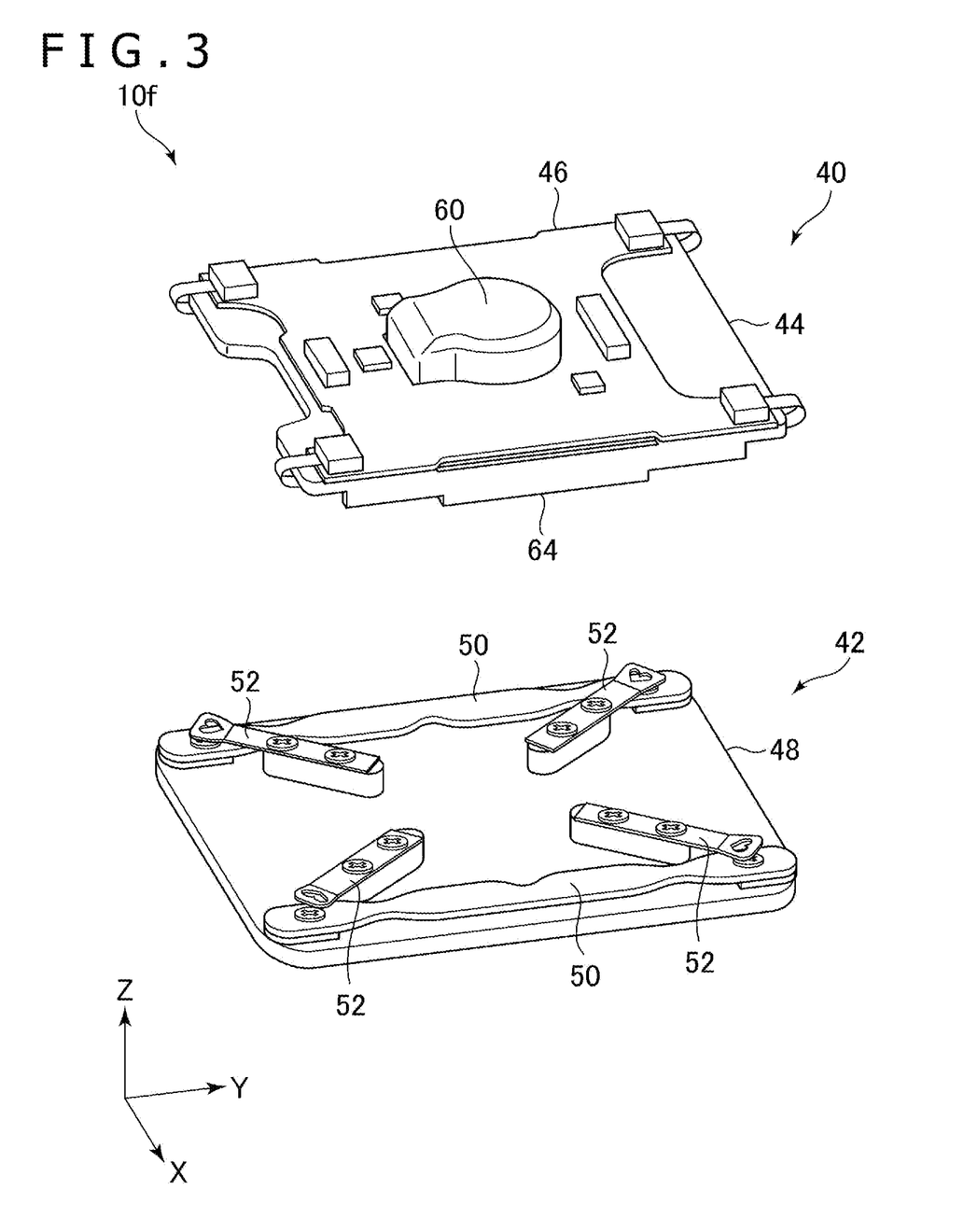
FIG. 3 is a schematic exploded perspective view of a foot of the humanoid robot that is the embodiment of the present invention.

FIG. 3 is a schematic exploded perspective view of the foot 10f. In the following description, it is assumed that the XYZ coordinate system is a rectangular coordinate system for the right hand system, and the Z axis is a vertical axis; the X axis is a horizontal axis in the leftward and rightward direction; and the Y axis is a horizontal axis in the forward and rearward direction. Further, the positive direction of the Z axis is the upward direction, the positive direction of the X axis is the direction from the right to the left of the humanoid robot 2, and the positive direction of the Y axis is the direction from the front to the rear. It is to be noted that, in the present embodiment, the general shape of the foot 10f is a plate shape whose thicknesswise direction is the Z direction, and the planar shape of the foot 10f is approximately a rectangular having short sides extending along the X direction and long sides extending along the Y direction.

Each of the left and right feet 10f has an instep member that is connected to the lower thigh 10d and receives the load of the humanoid robot 2 and a sole member that is deployed under the instep member and contacts with the walking surface. The instep member and the sole member are not limited to those including a single material and may individually include a plurality of parts or materials.

FIG. 3 depicts the foot 10f in a form in which it is disintegrated into an upper side part 40 including the instep member and a lower side part 42 including the sole member. The upper side part 40 includes an upper frame 44 having a planar shape of a substantially rectangular shape corresponding to the foot 10f; and an electric circuit board 46 deployed on an upper face of the upper frame 44. The upper frame 44 of the upper side part 40 basically corresponds to the instep member. The upper frame 44 is formed from a material and a structure that have high rigidity.

On the other hand, the lower side part 42 includes a lower frame 48 having a planar shape of a substantially rectangular shape corresponding to the foot 10f; and high rigidity springs 50 and sensor springs 52 deployed on an upper face of the lower frame 48. The lower frame 48 of the lower side part 42 basically corresponds to the sole member. The lower frame 48 is formed from a material and a structure that have high rigidity. Incidentally, as described hereinabove, the planar shape of the upper frame 44 and the lower frame 48 is a substantially rectangular shape corresponding to the foot 10f, and the shapes and the sizes of them can be made substantially same as each other.

Figure 4:
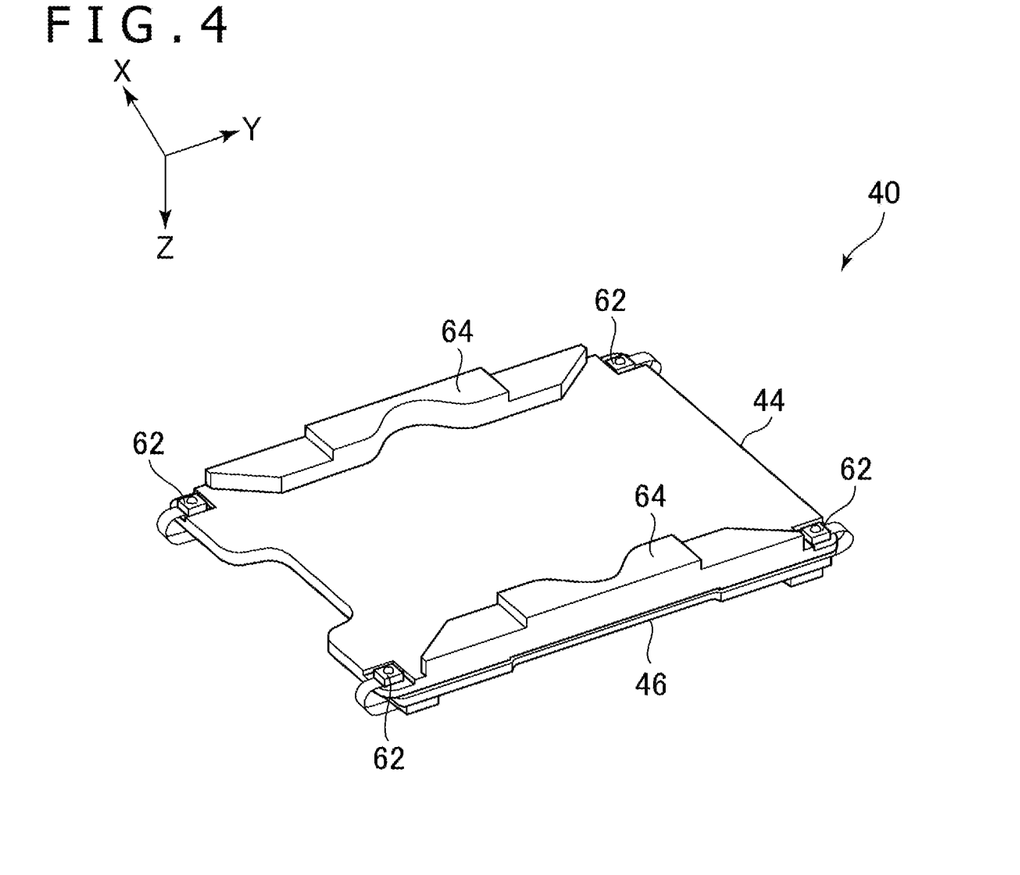
FIG. 4 is a schematic perspective view from the lower face side of an upper side part of the foot according to the embodiment of the present invention.
Figure 5:
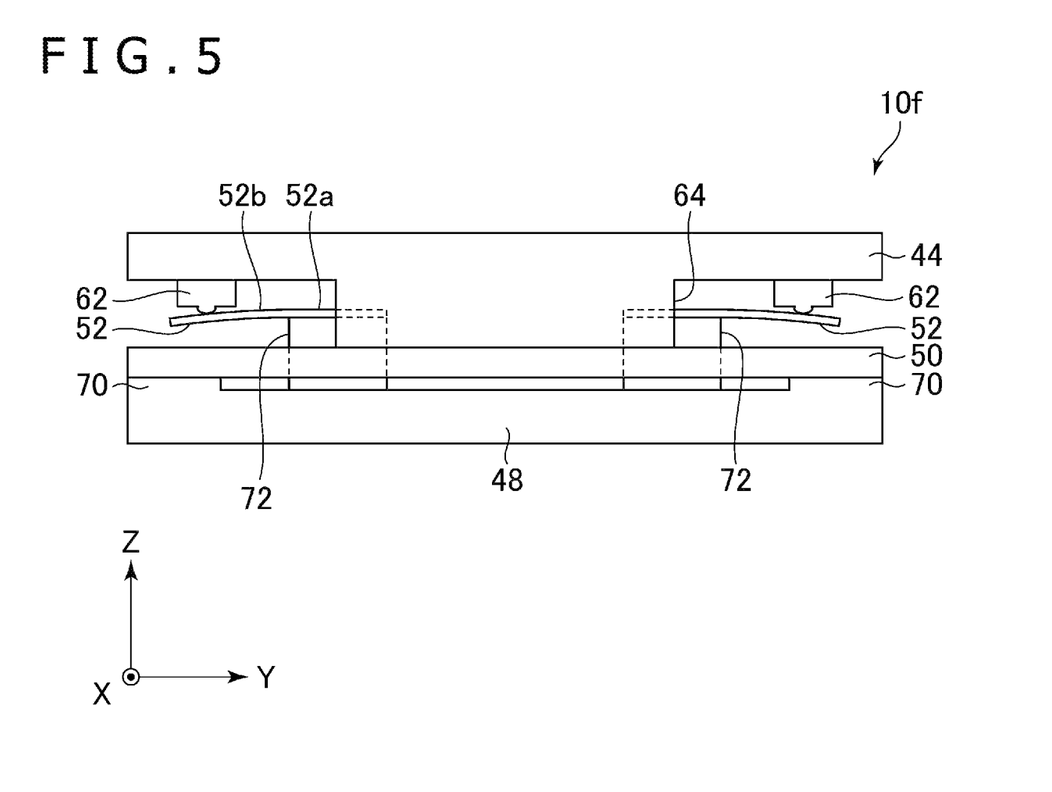
FIG. 5 is a schematic side elevational view of the foot according to the embodiment of the present invention.

The structure of the foot 10f is described in more detail. FIG. 4 is a schematic perspective view from the lower face side of the upper side part 40 reversely to the perspective view of FIG. 3 from the upper face side. Meanwhile, FIG. 5 is a schematic side elevational view of the foot 10f as viewed in the negative direction of the X axis (that is, as viewed from a near side in FIG. 3).

The upper frame 44 of the upper side part 40 has, at a substantially middle portion of the upper face thereof, a connection portion 60 for connection to the lower thigh 10d. In the present embodiment, the connection portion 60 is a projection formed on the upper face of the upper frame 44 and projects to the upper side through an opening provided in the electric circuit board 46. In particular, the connection portion 60 is connected to the structure of the foot joint including the actuator group 27 described hereinabove and is connected to the lower thigh 10d through the foot joint.

In each of the four corners of the lower face of the upper frame 44, a force sensor 62 that is part of the sensor mechanism for detecting the floor reaction force is attached with a pressure sensitive portion thereof directed downwardly. The force sensor 62 is electrically connected to the electric circuit board 46, for example, by a flexible board (FPC). Further, on an edge of each of the two long sides, which extend along the Y axis direction, of the lower face of the upper frame 44, an elongated projection is provided as a spring contacting portion 64. Here, the force sensor 62 is deployed at each of the opposite end portions of the long side, and the spring contacting portion 64 is deployed at a middle portion of the long side.

The high rigidity spring 50 deployed at the lower side part 42 of the foot 10f is an elastic supporting member that is attached to the lower frame 48 which is the sole member and that elastically supports the upper frame 44 as the instep member against the load of the humanoid robot 2. On the lower frame 48, a plurality of high rigidity springs 50 can be deployed at positions different from each other as viewed in top plan. In the present embodiment, the high rigidity springs 50 are leaf springs elongated in the Y axis direction and are deployed so as to face the spring contacting portions 64 of the upper frame 44 individually on the two long sides extending along the Y axis direction of the lower frame 48. In each of the four corners of the upper face of the lower frame 48, a projection that serves as a support base (spring supporting base 70) for the high rigidity spring 50 is provided, and the two spring supporting bases 70 lined up on one long side of the lower frame 48 support the opposite ends of the high rigidity spring 50 deployed on the opposite side as depicted in FIG. 5. Consequently, the high rigidity spring 50 extends between the spring supporting bases 70 lined up on each long side and is supported such that a middle portion of the high rigidity spring 50 in the Y axis direction is spaced upwardly away from the lower frame 48. The spring contacting portion 64 of the upper frame 44 contacts with a range elongated in the Y direction of the middle portion of the high rigidity spring 50, and if the high rigidity spring 50 is pressed against the spring contacting portion 64, then the high rigidity spring 50 is deflected in the downward direction and exerts upward elastic force to the spring contacting portion 64.

The foot 10f includes a plurality of sensor mechanisms for detecting the floor reaction force at positions different from each other on the sole member. Each of the sensor mechanisms includes a force sensor for detecting pressing force and a sensor pressing member that exerts pressing force according to the floor reaction force to the force sensor. In the present embodiment, the force sensor 62 and a sensor spring 52 that is the sensor pressing member are provided in pair corresponding to one sensor mechanism. As described above, the force sensor 62 is deployed on the upper frame 44 that is the instep member. On the other hand, the sensor spring 52 is an elastic member having rigidity lower than that of the high rigidity spring 50 and has a supporting point deployed on the lower frame 48 that is the sole member such that the sensor spring 52 exerts pressing force to the force sensor 62 according to a change in distance in the Z direction between the upper frame 44 and the lower frame 48. In the present embodiment, the sensor spring 52 is a leaf spring. Incidentally, the pressing force of the sensor springs 52 upon the force sensor 62 increases as the distance between the upper frame 44 and the lower frame 48 in the Z direction decreases.

Here, the rigidity becomes higher when a material having a higher elastic modulus such as a Young's modulus or a modulus of rigidity is used. Further, in a case where the material is same, the rigidity becomes higher if the thickness is increased or a cross section having a higher cross-sectional performance such as an H-shaped cross section or a tubular cross section is used. Also in regard to the rigidity, several types are available corresponding to types of deformation such as bending deformation, axial deformation, shear deformation, and torsional deformation. In the present embodiment, the high rigidity springs 50 and the sensor springs 52 are leaf springs, and the relative rigidity of them can be defined by comparison in bending rigidity. In particular, the bending rigidity k is given, using a Young's modulus E, a moment I of inertia of area, and a distance L between the point of action and the supporting point of force, by k=EI/L. For example, the Young's modulus of pure ion, stainless steel, and brass decreases in this order. For example, by forming the sensor springs 52 from a material having a Young's module lower than that of the high rigidity springs 50 or by making the thickness of the sensor springs 52 smaller, the rigidity of the sensor springs 52 can be made lower than that of the high rigidity springs 50.

Projections serving as mounts (spring mounts 72) for the sensor springs 52 are provided on the upper face of the lower frame 48. A plate-shaped member configuring each of the sensor springs 52 has a portion (fixed portion 52a) fixed to the upper face of the spring mount 72 and a movable arm portion 52b protruding from the upper face of the spring mount 72. The sensor spring 52 is supported at the fixed portion 52a thereof by the spring mount 72, and the arm portion 52b is contacted by the pressure sensitive portion of the force sensor 62.

For example, the member that forms the sensor spring 52 can be formed so as to have a planar shape elongated in the direction in which the arm portion 52b protrudes, and this direction can be made a direction from the position of the force sensor 62 on the XY plane toward the center of the lower frame 48, that is, a diagonal line direction of the lower frame 48 of a substantially rectangular shape. In this configuration, the spring mount 72 is deployed on the diagonal line. By deploying the sensor spring 52 so as to extend in a direction different from the Y axis direction from the position of the force sensor 62 in this manner, the spring mount 72 can be deployed avoiding the positions of the high rigidity spring 50 and the spring contacting portion 64.

It is to be noted that the force sensor 62 is deployed in each of the four corners of the upper frame 44, and the second mechanism including the force sensor 62 is also deployed in each of the four corners of the substantially rectangular shape of the foot 10f. Corresponding to this, the spring mount 72 is provided in the proximity of an angular portion of each of the four corners, and the arm portions 52b of the sensor springs 52 extend from the spring mounts 72 to positions that face the pressure sensitive portions of the force sensors 62 at the angular portions. An end portion of the sensor spring 52 on the arm portion 52b side is positioned above an end portion of the high rigidity spring 50.

Here, the projection amount of the spring contacting portion 64 from the lower face of the upper frame 44 (height of the projection) and the height of the spring mount 72 are designed such that a scheduled range of displacement of the pressure sensitive portion of the force sensor 62 and the arm portion 52b in the Z direction is positioned above the high rigidity spring 50. Although the force sensor 62 and the arm portion 52b can overlap with the high rigidity spring 50 as viewed in top plan, the design just mentioned can avoid interference with the high rigidity springs 50.

Incidentally, the load received by the upper frame 44 changes according to the posture or the motion state of the humanoid robot 2, and the high rigidity springs 50 elastically support the upper frame 44, as described hereinabove, against the load within the supposed range of the change. In particular, although the upper frame 44 is acted upon by combined force of the elastic force of the high rigidity springs 50 and the elastic force of the plurality of sensor springs 52, the upper frame 44 can be supported on the lower frame 48 only by the elastic force of the high rigidity springs 50 from within the combined force. For example, even if supposed a maximum load is applied to the high rigidity springs 50 in a state in which the sensor springs 52 do not exit, the high rigidity springs 50 do not interfere with the lower frame 48 at the positions of the spring contacting portions 64.

According to this configuration of the foot 10f, most part of the floor reaction force according to the load applied to the upper frame 44 is exerted to the upper frame 44 by the high rigidity springs 50, and the force that the sensor springs 52 exert to the force sensor 62 can be restricted to part of the floor reaction force. This can be considered as a configuration by which the floor reaction force is imparted not directly but indirectly to the force sensors 62. Since the force sensors 62 are acted upon indirectly by the load or the floor reaction force in this manner, a sensor having a small withstand load can be used for the force sensor 62.

In a state in which a load is applied to the upper frame 44, the foot 10*f* basically is in a grounded state, and the lower frame 48 is in a state in which it is pressed against the upper frame 44 by the floor reaction force. On the other hand, the foot 10*f* can be placed into a state in which it is spaced away from the walking face, for example, by a walking motion (non-grounded state). The foot 10*f* has a structure in which, for example, the lower frame 48 is tethered to the upper frame 44 such that the lower frame 48 does not come off in the non-grounded state. By this structure, a separation state in which the upper frame 44 and the lower frame 48 are spaced furthest away from each other is defined. Here, if a process in which the foot is pulled up and placed from a grounded state into a non-grounded state by a walking motion, then it initially is in the grounded state in which a positive load according to the weight of the humanoid robot 2 and so forth acts upon the upper frame 44, and as the foot moves up from the grounded state, the load decreases and a zero load state in which the load is zero is entered first. Then, as the foot is moved up further in the zero load state, a separation state or a non-grounded state is entered.

In the zero load state, the sensor springs 52 are pressed against the force sensors 62. In particular, each of the sensor springs 52 is biased in advance with a distance between the upper frame 44 and the lower frame 48 at the point of time at which the load exerted to the upper frame 44 becomes zero from a positive value (or at the point of time at which the floor reaction force acting upon the lower frame 48 changes from a positive value to zero), that is, the sensor springs 52 are preloaded. Also in the separation state, the sensor springs 52 can be placed in the biased state. By applying preload to the sensor springs 52 or placing the sensor springs 52 into a biased state in the separation state, what is called a failure state in which the sensor springs 52 do not contact with the pressure sensitive portions of the force sensors 62, the failure state arising from dispersion of parts or the like, can be avoided, and occurrence of a dead zone in which the floor reaction force and/or the load do not detected by the sensor mechanisms including the sensor springs 52 and the force sensor 62 can be prevented.

Further, the distance between the upper frame 44 and the lower frame 48 in the separation state of them defined by the above-described structure for preventing the lower frame 48 from coming off can be set to a magnitude with which the contacting portion 64 is not pressed against the high rigidity spring 50, that is, the spring contacting portion 64 is not acted upon by upward elastic force from the high rigidity spring 50, and even in such a state as just described, the sensor springs 52 can be set so as to be placed in the preload state as described above. Consequently, the range in which the load is detected by the sensor mechanisms including the sensor springs 52 can be expanded in the negative load direction.

As described hereinabove, the sensor mechanisms deployed in the four corners of the foot 10*f* form part of the various sensors 31, and signals detected by the sensor mechanisms, particularly, output signals of the force sensors 62, are inputted to the control unit 30. For example, the control unit 30 uses the output signals of the force sensors 62 to calculate the floor reaction force at each of the right and left feet and the center of gravity of the humanoid robot 2, and controls the walking motion with use of results of the calculation. In particular, the control unit 30 calculates, on the basis of measurement values of the magnitude of the floor reaction force obtained by the sensor mechanisms at the plurality of positions in the XY plane of one foot 10*f*, a floor reaction force vector acting on the foot 10*f* (composite vector of the floor reaction force over the overall sole) and the point of action of the floor reaction force vector. In the present embodiment, the sensor mechanism is deployed at each of four locations in the XY plane and can calculate, basically using the measurement values at the three or more locations, two-dimensional coordinates in the XY plane of the point of action of the floor reaction force on the foot 10*f*, and can calculate the floor reaction force as a three-dimensional vector in the XYZ space. In short, if three or more sensor mechanisms are available, then such calculation as just described can be performed. Further, the control unit 30 calculates the ZMP of the humanoid robot 2 on the basis of outputs of the force sensors 62.

Since the sensor mechanisms each including the force sensor 62 can detect a negative load, it is possible to accurately calculate the floor reaction force on the foot 10*f* under a wider range of circumstances. In particular, for example, in a case where, in regard to the forward and backward direction of the humanoid robot 2, the point of action of the floor reaction force vector is positioned on the sole forwardly (on the left side in FIG. 5) than the spring contacting portion 64, the distance between the upper and lower frames decreases forwardly (on the left side in FIG. 5) while the distance increases rearwardly (on the right side in FIG. 5). In this case, since the sensor mechanisms can detect a negative load, the sensor mechanism in the rear (on the right side in FIG. 5) can also obtain an effective measurement value, and this facilitates obtainment of measurement values at a plurality of positions necessary for calculation of a floor reaction force vector and a point of action described hereinabove. Further, since the sensor mechanism can detect a negative load, even in a case in which the point of action of a floor reaction force vector is positioned in a region outside a quadrangle having vertices at detection points at which the floor reaction force is detected by the sensor mechanisms in the four corners, the position can be calculated.

In the present embodiment, the high rigidity spring 50 is deployed at each of the opposite left and right end portions of the lower frame 48. By deploying the elastic supporting member, which acts against the load of the upper frame 44, at a plurality of positions of the lower frame 48 as viewed in top plan in this manner, even if some difference in magnitude of the floor reaction force exists in the XY plane, the influence of the difference on the sensor mechanism is moderated. For example, in a case where, in the present embodiment, the floor reaction force on the left side of the foot 10*f* is greater than that on the right side, the force acting upon the two sensor mechanisms, of the sensor mechanisms at the four locations, on the left side is higher than that acting upon the two sensor mechanisms on the right side. However, the difference in force between the left and the right can become smaller than that in a case where a single elastic supporting member is applied, if the high rigidity springs 50 on the left side exert, on the upper frame 44, elastic force higher than that of the high rigidity springs 50 on the right side. Therefore, the configuration that the elastic supporting member is deployed at a plurality of locations contributes to reduction of the withstand load of the force sensor 62.

Further, also elongation of the spring contacting portion 64 along the extension direction of the high rigidity spring 50 can achieve similar effects. For example, in a case where the floor reaction force on the front side of the foot 10*f* and the floor reaction force on the left side of the foot 10*f* are greater than that on the rear side of the foot 10*f* and that on the right side of the foot 10*f*, respectively, the force acting upon the two sensor mechanisms, of the sensor mechanisms at the four locations, on the front side of is greater than that acting upon the two sensor mechanisms on the rear side. However, the difference in force between the front and the rear can be moderated if the high rigidity springs 50 extending in the Y direction, that is, in the forward and rearward direction, exert high elastic force at a front portion rather than a rear portion with respect to the spring contacting portion 64.

It is to be noted that, although the high rigidity springs 50 and the sensor springs 52 in the embodiment described hereinabove are each a leaf spring, it may be a spring of a different type. Further, although the high rigidity springs 50 that are parts different from the lower frame 48 are attached to the lower frame 48 in the embodiment described hereinabove, the high rigidity springs 50 may otherwise be formed integrally with the lower frame 48.

It is also possible to place the sensor mechanism upside down, in other words, the sensor mechanism can be configured such that the force sensors 62 are attached to the lower frame 48 and the supporting points of the sensor springs 52 are deployed on the upper frame 44. Further, the high rigidity springs 50 may be provided on the upper frame 44 side or may extend in the X direction, that is, in the leftward and rightward direction.

The invention claimed is:

1. A foot structure of a legged mobile robot, which is a structure of a foot provided at a lower end of a movable leg of the legged mobile robot, the foot structure comprising:
    an instep member that is connected to the movable leg and receives a load of the legged mobile robot;
    a sole member that is deployed under the instep member and contacts with a walking surface;
    an elastic supporting member that is attached to the sole member and elastically supports the instep member against the load; and
    a plurality of sensor mechanisms that detect floor reaction force at positions different from each other on the sole member,
    wherein:
        each of the plurality of sensor mechanisms includes:
            a force sensor provided on one of the instep member and or the sole member, and
            a sensor pressing member that:
                is an elastic body having a rigidity lower than that of the elastic supporting member,
                exerts a pressing force to the force sensor, according to a change in distance between the instep member and the sole member, and
                has a supporting point deployed on the other of the instep member or the sole member at a position not vertically aligned with the force sensor such that the force sensor is closer to an outer edge of the foot structure than the supporting point,
        the force sensor is attached to the instep member,
        the supporting point of the sensor pressing member is deployed on the sole member,
        each of the plurality of sensor mechanisms is provided at an angular portion corresponding to each of vertices of a rectangular shape including sides extending along a forward and rearward direction of the foot and sides extending along a leftward and rightward direction of the foot,
        the sensor pressing member is a leaf spring extending along a diagonal line of the rectangular shape, and
        the sole member has, on the diagonal line, a spring mount to which the sensor pressing member is attached, as the supporting point thereof.

2. The foot structure according to claim 1, wherein the sensor pressing member is biased and pressed against the force sensor with a distance between the instep member and the sole member at a point of time at which the load exerted to the instep member changes from a positive value to zero.

3. The foot structure according to claim 1, wherein
    the foot structure is structured such that, when the sole member is spaced away from the walking surface, the sole member is tethered to the instep member to define an upper limit distance between the instep member and the sole member, and
    the sensor pressing member is biased and pressed against the force sensor with the upper limit distance between the instep member and the sole member.

4. The foot structure according to claim 1, wherein the plurality of sensor mechanisms comprises three or more of the sensor mechanisms.

5. A foot structure of a legged mobile robot, which is a structure of a foot provided at a lower end of a movable leg of the legged mobile robot, the foot structure comprising:
    an instep member that is connected to the movable leg and receives a load of the legged mobile robot;
    a sole member that is deployed under the instep member and contacts with a walking surface;
    an elastic supporting member that is attached to the sole member and elastically supports the instep member against the load; and
    a plurality of sensor mechanisms that detect floor reaction force at positions different from each other on the sole member,
    wherein each of the plurality of sensor mechanisms includes:
        a force sensor provided on one of the instep member or the sole member, and
        a sensor pressing member that:
            is an elastic body having a rigidity lower than that of the elastic supporting member,
            exerts a pressing force to the force sensor, according to a change in distance between the instep member and the sole member, and
            has a supporting point deployed on the other of the instep member or the sole member at a position not vertically aligned with the force sensor such that the force sensor is closer to an outer edge of the foot structure than the supporting point,
    wherein the elastic supporting member is deployed at each of a plurality of positions of the sole member as viewed in top plan, and
    wherein the elastic supporting member is a leaf spring elongated in a forward and rearward direction of the foot as viewed in top plan and is deployed at each of opposite left and right end portions of the sole member
    wherein the foot structure further comprises:
        spring supporting bases that are provided on the sole member and support thereon opposite ends of the elastic supporting member in the forward and rearward direction such that a middle portion of the elastic supporting member is spaced away upwardly from the sole member; and
        a spring contacting portion that is a projection provided on a lower face of the instep member so as to face the middle portion of the elastic supporting member at each of the opposite left and right end portions and that is pressed against a range of the elastic supporting member, which range is elongated in the forward and rearward direction, such that elastic force is exerted to the spring contacting portion from the elastic supporting member.

6. A foot structure of a legged mobile robot, which is a structure of a foot provided at a lower end of a movable leg of the legged mobile robot, the foot structure comprising:

an instep member that is connected to the movable leg and receives a load of the legged mobile robot;

a sole member that is deployed under the instep member and contacts with a walking surface;

an elastic supporting member that is attached to the sole member and elastically supports the instep member against the load; and a plurality of sensor mechanisms that detect floor reaction force at positions different from each other on the sole member, wherein each of the plurality of sensor mechanisms includes:

a force sensor provided on one of the instep member or the sole member, and a sensor pressing member that:

is an elastic body having a rigidity lower than that of the elastic supporting member, exerts a pressing force to the force sensor, according to a change in distance between the instep member and the sole member, and has a supporting point deployed on the other of the instep member or the sole member at a position not vertically aligned with the force sensor such that the force sensor is closer to an outer edge of the foot structure than the supporting point, wherein the foot has a substantially rectangular shape as viewed in top plan and has angular portions forming four corners, long sides extending along a forward and rearward direction, and short sides extending along a leftward and rightward direction, the sole member has a spring supporting base at each of the angular portions and has a spring mount on a diagonal line of the substantially rectangular shape in a proximity of each of the angular portions, the elastic supporting members are each a leaf spring elongated in the forward and rearward direction and extend between a pair of the spring supporting bases on a left side of the sole member and between a pair of the spring supporting bases on a right side of the sole member, the sensor pressing member is a leaf spring attached at one end portion thereof to each of the spring mounts and extends along the diagonal line, the other end portion of the sensor pressing member being positioned above an end portion of the elastic supporting member at the angular portion in a proximity of the spring mount, and the instep member has the force sensor deployed at each of the angular portions thereof, the pressing force being exerted to the force sensor from the other end portion of the sensor pressing member, and has, at each of opposite left and right end portions of a lower face thereof, a spring contacting portion that is pressed against a range elongated in the forward and rearward direction of the elastic supporting member such that elastic force is exerted to the spring contacting portion from the elastic supporting member.

* * * * *